(12) United States Patent
Awater et al.

(10) Patent No.: US 7,996,236 B2
(45) Date of Patent: *Aug. 9, 2011

(54) WIRELESS LAN WITH LOAD BALANCING

(75) Inventors: Geert Arnout Awater, Utrecht (NL); Adriaan Kamerman, Utrecht (NL); Hendrik Moelard, Maarssen (NL)

(73) Assignee: Agere Systems Inc., Allentown, PA (US)

( * ) Notice: Subject to any disclaimer, the term of this patent is extended or adjusted under 35 U.S.C. 154(b) by 1055 days.

This patent is subject to a terminal disclaimer.

(21) Appl. No.: 11/650,011

(22) Filed: Jan. 5, 2007

(65) Prior Publication Data

US 2007/0109980 A1 May 17, 2007

Related U.S. Application Data

(63) Continuation of application No. 09/859,334, filed on May 17, 2001, now Pat. No. 7,173,918.

(30) Foreign Application Priority Data

May 19, 2000 (EP) .................................... 00304239

(51) Int. Cl.
*G06Q 10/00* (2006.01)
(52) U.S. Cl. ........................ 705/1.1; 455/436; 370/332
(58) Field of Classification Search .................. 705/1.1; 455/436; 370/332
See application file for complete search history.

(56) References Cited

U.S. PATENT DOCUMENTS

| | | | | |
|---|---|---|---|---|
| 5,448,569 A | * | 9/1995 | Huang et al. | 370/332 |
| 5,649,290 A | * | 7/1997 | Wang | 370/332 |
| 5,717,688 A | * | 2/1998 | Belanger et al. | 370/331 |

(Continued)

FOREIGN PATENT DOCUMENTS

EP 0 528 522 A2 6/1992

(Continued)

OTHER PUBLICATIONS

"*QOS Provisioning In Handoff Algorithms For Wireless LAN*," by Chi-chun Lo, Ming-Hua Lin, Proceedings of International Zurich Seminar on Broadband Communications, Zurich, Switzerland, Feb. 17-19, 1998, pp. 9-16, XP002151137, 1998, New York, NY, USA, IEEE.

*Primary Examiner* — Dennis Ruhl
*Assistant Examiner* — Scott A Mattia
(74) *Attorney, Agent, or Firm* — Mendelsohn, Drucker & Associates, P.C.; Steve Mendelsohn

(57) ABSTRACT

A communication system with a plurality of access points (AP1, AP2, AP3) and at least one network station (5, 6), the network station (5, 6) being arranged to communicate with one of said the plurality of access points (AP1, AP2, AP3) through a wireless communication protocol, each access point (AP1, AP2, AP3) is able to monitor its access point traffic load and transmit an access point traffic load parameter (ATT) to the network station (5, 6), and the network station (5, 6) is able to monitor its network station traffic load; store a network station traffic load parameter (AUTT); receive access point traffic load parameters (ATT) from the access points (AP1, AP2, AP3); and select a communication connection with one of the access points (AP1, AP2, AP3) using a predetermined cost function taking the access point traffic load parameters (ATT) and the network station traffic load parameters (AUTT) into account.

22 Claims, 6 Drawing Sheets

U.S. PATENT DOCUMENTS

| | | | |
|---|---|---|---|
| 5,815,811 A * | 9/1998 | Pinard et al. | 455/434 |
| 5,822,318 A | 10/1998 | Tiedemann, Jr. et al. | 370/391 |
| 5,856,971 A | 1/1999 | Gitlin et al. | 370/335 |
| 5,933,420 A | 8/1999 | Jaszewski et al. | 370/329 |
| 5,987,062 A * | 11/1999 | Engwer et al. | 375/225 |
| 6,047,175 A * | 4/2000 | Trompower | 455/452.1 |
| 6,055,433 A * | 4/2000 | Yuan et al. | 455/453 |
| 6,067,291 A | 5/2000 | Kamerman et al. | 370/338 |
| 6,069,871 A * | 5/2000 | Sharma et al. | 370/209 |
| 6,101,179 A | 8/2000 | Soliman | 370/342 |
| 6,134,226 A | 10/2000 | Reed et al. | 370/328 |
| 6,215,982 B1 | 4/2001 | Trompower | 455/63 |
| 6,377,562 B1 | 4/2002 | Schneider | 370/330 |
| 6,393,261 B1 | 5/2002 | Lewis | 455/103 |
| 6,456,850 B1 | 9/2002 | Kim et al. | 455/453 |
| 6,470,184 B1 | 10/2002 | Machida | 455/453 |
| 6,526,027 B1 | 2/2003 | Yeom | 370/312 |
| 6,580,700 B1 | 6/2003 | Pinard et al. | 370/332 |
| 6,584,315 B1 | 6/2003 | Kang et al. | 455/442 |
| 6,611,506 B1 | 8/2003 | Huang et al. | 370/329 |
| 6,646,995 B1 | 11/2003 | Le Strat et al. | 370/252 |
| 6,675,020 B2 | 1/2004 | Sawyer | 455/522 |
| 6,954,616 B2 | 10/2005 | Liang et al. | 455/63.1 |
| 6,978,143 B1 | 12/2005 | Vialen | 455/452.2 |
| 2002/0021679 A1 | 2/2002 | Paneth et al. | 370/330 |
| 2002/0105926 A1 | 8/2002 | Famolari et al. | 370/331 |
| 2002/0111163 A1 | 8/2002 | Hamabe | 455/425 |
| 2004/0264498 A1 | 12/2004 | Feuerstraeter et al. | 370/465 |

FOREIGN PATENT DOCUMENTS

EP  0 903 891 A1  9/1998

* cited by examiner

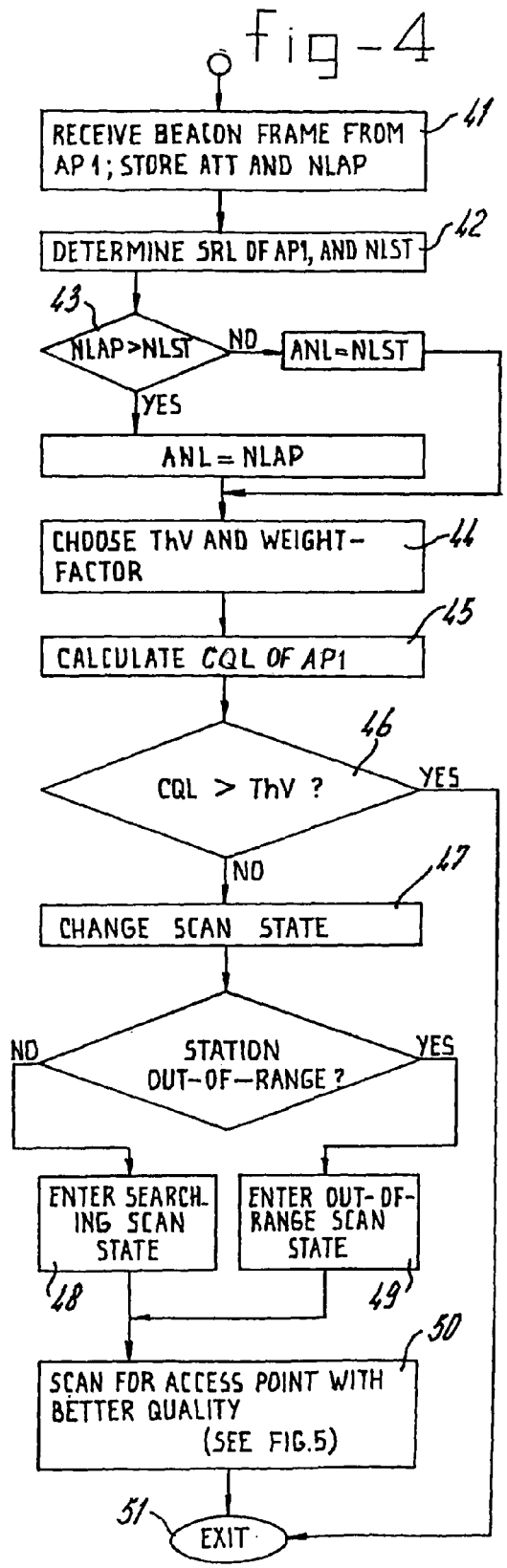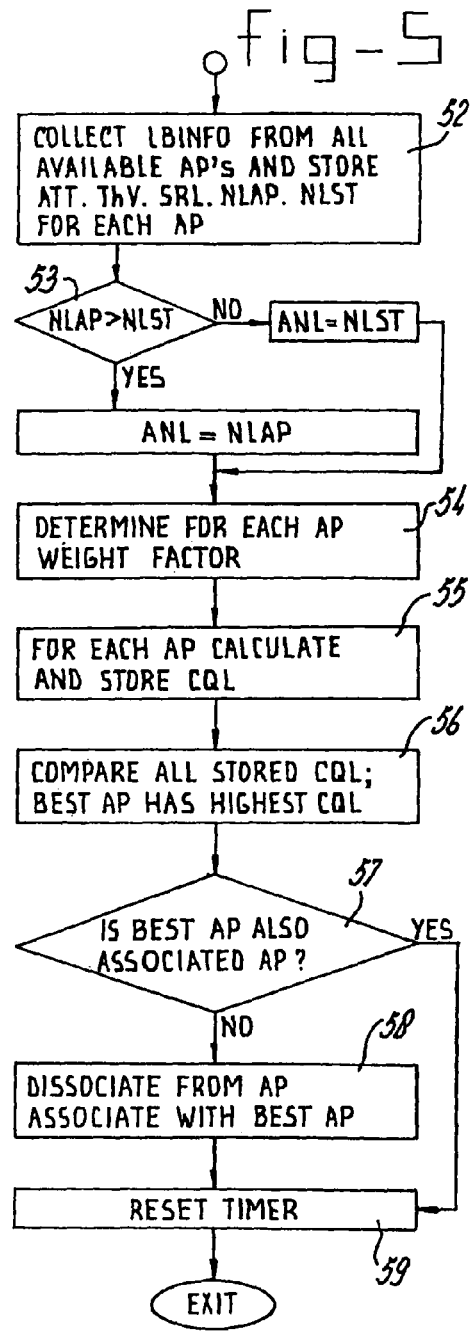

WIRELESS LAN WITH LOAD BALANCING

CROSS-REFERENCE TO RELATED APPLICATIONS

This application is a continuation of U.S. patent application Ser. No. 09/859,334, filed on May 17, 2001, now U.S. Pat. No. 7,173,918, which itself claims priority of European Patent application serial no. 00304239.7, filed on May 19, 2000, the teachings of both of which are incorporated herein by reference.

FIELD OF THE INVENTION

The present invention relates to communication system comprising a plurality of access points and at least one network station, said at least one network station being arranged to communicate with one of said plurality of access points through a wireless communication protocol.

PRIOR ART

Recently, wireless local area networks (LANs) have been developed as an enhanced replacement for wired LANs. In a wireless LAN for data-communication a plurality of (mobile) network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802-11 international standard (IEEE 802.11). IEEE 802.11 describes a standard for wireless LAN systems that will operate in the 2.4-2.5 GHz ISM (industrial, scientific and medical) band. This ISM band is available worldwide and allows unlicensed operation for spread spectrum systems. For both the US and Europe, the 2,400-2,483.5 MHz band has been allocated, while for some other countries, such as Japan, another part of the 2.4-2.5 GHz ISM band has been assigned. The IEEE 802.11 standard focuses on the MAC (medium access control) and PHY (physical layer) protocols for access point based networks and ad-hoc networks.

In access point based wireless networks, the stations within a group or cell can communicate only directly to the access point. This access point forwards messages to the destination station within the same cell or through the wired distribution system to another access point, from which such messages arrive finally at the destination station. In ad-hoc networks, the stations operate on a peer-to-peer level and there is no access point or (wired) distribution system.

The 802.11 standard supports three PHY protocols: DSSS (direct sequence spread spectrum), FHSS (frequency hopping spread spectrum), and infrared with PPM (pulse position modulation). All these three PHYs all provide bit rates of 1 and 2 Mbit/s. Furthermore, IEEE 802.11 includes extensions 11a and 11b which allow for additional higher bit rates: Extension 11b provides bit rates 5.5 and 11 Mbit/s as well as the basic DSSS bit rates of 1 and 2 Mbit/s within the same 2.4-2.5 GHz ISM band. Extension 11a provides a high bit rate OFDM (Orthogonal Frequency Division Multiplexing modulation) PHY standard providing bit rates in the range of 6 to 54 Mbit/s in the 5 GHz band.

The IEEE 802.11 basic MAC protocol allows interoperability between compatible PHYs through the use of the CSMA/CA (carrier sense multiple access with collision avoidance) protocol and a random back-off time following a busy medium condition. The IEEE 802.11 CSMA/CA protocol is designed to reduce the collision probability between multiple stations accessing the medium at the same time. Therefore, a random back-off arrangement is used to resolve medium contention conflicts. In addition, the IEEE 802.11 MAC protocol defines special functional behaviour for fragmentation of packets, medium reservation via RTS/CTS (request-to-send/clear-to-send) polling interaction and point coordination (for time-bounded services).

Moreover, the IEEE 802.11 MAC protocol defines Beacon frames sent at regular intervals by the access point to allow stations to monitor the presence of the access point. The IEEE 802.11 MAC protocol also gives a set of management frames including Probe Request frames which are sent by a station and are followed by Probe Response frames sent by an available access point, to allow a station to scan actively if there is an access point operating on a certain channel frequency and to show to the station what parameter settings this access point is using.

In a wireless local area network, most stations are mobile: they may move around, more or less freely, in the network area. The range covered by a specific access point is however limited: the cell size around an access point is defined for the (expected) requirements of the (average) number of stations associated with the cell and the amount of network traffic these stations generate: Cell sizes vary from small where a high traffic density is anticipated, to large for a low traffic density. Also, the cell size is limited by physical constraints.

Thus, in order to stay connected to the network, mobile stations may need to change their association from one access point to another when the reception level of the associated access point becomes too low. The choice by the station to switch between access points is based on the station's relative reception levels of the access points involved. This procedure is known in the art as roaming.

In the prior art, this roaming procedure is based on the selected configuration setting for one of the different access point (AP) density settings which influence defer, carrier detect and cell search behaviour. A network station can be configured for cell sizes in a scale from large to small with corresponding AP density levels ranging from low to high. When the network station is configured for a large cell size (AP density low), it will allow more degradation in the reception conditions of the connection to the access point before it starts looking for an access point which can be received better. When in this case, for example, the access point is configured for a small cell size (AP density high), the network station will start looking for an access point which can be received better.

European patent application 00302533.5 filed on Feb. 1, 2001, describes the method that network stations use to (re)configure their settings relating to cell size and AP density automatically, depending on the access point to which they associate.

However, the traffic load of the cells is not taken into account in this roaming procedure. It is possible that the station disassociates from an access point with a low traffic load, and associates with another access point that has a relatively high traffic load. By joining the cell of this access point, its traffic load may even increase further, which may result in a degradation of the traffic within the latter cell (by traffic between stations within the cell) and even in the complete network (by traffic between stations in the cell and stations outside of it). Also, it is possible that a network station is associated with an access point with a high traffic load and a good signal reception level, while other access points may have lower traffic load and acceptable signal reception levels. When traffic load is not taken into account, the network station will not switch over to another access point and the load in the network can become unbalanced.

It is an object of the present invention to improve the roaming procedure in such a way that switching (association) of stations from one cell to another is not only based on signal reception levels but also on the traffic load of the cells. Furthermore, it is an object of the present invention to balance the traffic load of a wireless LAN by redistributing load (i.e., stations) over the cells in the network. By the present invention a better overall throughput behaviour for the wireless LAN will be provided.

SUMMARY OF THE INVENTION

In one embodiment, the present invention relates to a communication system comprising a plurality of access points and at least one network station. The network station is arranged to communicate with one of the access points through a wireless communication protocol. Each access point is arranged to (1) monitor its access point traffic load and (2) transmit an access point traffic load parameter indicative of the access point traffic load to the network station. The network station is arranged to (1) monitor its network station traffic load, (2) store a network station traffic load parameter indicative of the network station traffic load, (3) receive access point traffic load parameters from the plurality of access points, and (4) select a communication connection with one of the access point using a predetermined cost function taking at least the access point traffic load parameters and the network station traffic load parameters into account.

In another embodiment, the present invention relates to an access point arranged to communicate with at least one network station through a wireless communication protocol. The access point is also arranged to (1) monitor its access point traffic load and (2) transmit an access point traffic load parameter indicative of the access point traffic load to the network station.

In yet another embodiment, the present invention relates to a network station arranged to communicate with one of a plurality of access points through a wireless communication protocol. The network station is arranged to (1) monitor its network station traffic load, (2) store a network station traffic load parameter indicative of the network station traffic load, (3) receive access point traffic load parameters indicative of access point traffic loads from the plurality of access points, (4) select a communication connection with one of the access points using a predetermined cost function taking at least the access point traffic load parameters and the network station traffic load parameters into account.

In yet another embodiment, the present invention relates to a method in a communication system comprising a plurality of access points and at least one network station for communication between the network station and one of the access points. The network station is arranged to communicate with one of the access point through a wireless communication protocol. The method comprises the following steps carried out by the access points: (1) monitoring access point traffic loads and (2) transmitting access point traffic load parameters indicative of the access point traffic loads to the network station. The method also includes the following steps carried out by the network station: (1) monitoring network station traffic load, (2) storing a network station traffic load parameter indicative of the network station traffic load, (3) receiving access point traffic load parameters from the plurality of access points, and (4) selecting a communication connection with one of the access points using a predetermined cost function taking at least the access point traffic load parameters and the network station traffic load parameters into account.

In yet another embodiment, the present invention relates to a method carried out by an access point arranged to communicate with at least one network station through a wireless communication protocol. The method comprises the following steps: (1) monitoring access point traffic load and (2) transmitting an access point traffic load parameter indicative of the access point traffic load to the network station.

In yet another embodiment, the present invention relates to a method to be carried out by a network station arranged to communicate with one of a plurality of access points through a wireless communication protocol. The method comprises the following steps: (1) monitoring network station traffic load, (2) storing a network station traffic load parameter indicative of the network station traffic load, (3) receiving access point traffic load parameters indicative of access point traffic loads from the plurality of access points, and (4) selecting a communication connection with one of the access points using a predetermined cost function taking at least the access point traffic load parameters and the network station traffic load parameters into account.

By the present invention, a better overall throughput behaviour for the wireless LAN will be provided.

BRIEF DESCRIPTION OF THE DRAWINGS

Below, the invention will be explained with reference to some drawings, which are intended for illustration purposes only and not to limit the scope of protection as defined in the accompanying claims.

FIG. 4 shows a flow diagram to illustrate the method of roaming in the present invention;

FIG. 5 shows a flow diagram to illustrate the method of load balancing in the present invention.

DESCRIPTION OF PREFERRED EMBODIMENTS

Figure 1:
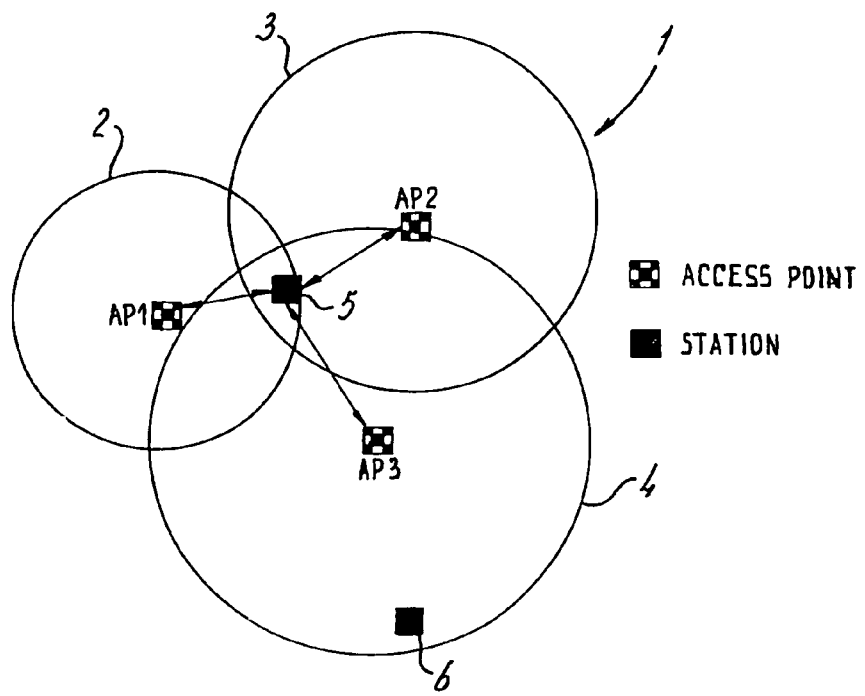
FIG. 1 shows a schematic overview of a wireless LAN comprising a plurality of network cells and a network station to illustrate the invention.

FIG. 1 shows a schematic overview of a wireless LAN 1 in which the invention is implemented. The wireless LAN 1 includes a number of access points of which three access points are shown AP1, AP2, AP3. These access points serve as access point for their respective cells 2, 3, 4 which are each schematically depicted by a circle around their respective access point. In the LAN 1 a plurality of network stations 5, 6 is present of which two are shown. Each access point AP1, AP2, AP3 is connected (not shown) via suitable I/O means to a wired distribution network for communication with other access points. In LAN 1 the actual number of network stations 5 may be 0 (zero) or more. The network stations 5, 6 may be mobile or at fixed positions: they all connect to the network 1 by means of wireless data-communication. In this embodiment of the invention the network stations 5, 6 are represented by personal computers, but it is to be understood that the network stations may be any type of telecommunication equipment that uses a wireless data-communication network, such as mobile telephones, pagers, PDAs (personal digital assistants), laptop computers, etc.

The cells 2, 3, 4 have different sizes as depicted by the size of the circles. The cell size is determined by the requirements of data throughput in the cell and can be controlled by suitable setting of the levels of the defer behaviour threshold and carrier sense detection threshold (for a cell including all its associated stations or, for stations individually) as known from EP-A-0903891. For example, a cell 2 may comprise a number of network stations that require high throughputs. In that case, the cell size should be small such that other network stations will be left out of the cell as much as possible. In another case, for example, in a cell 4 only few network station with low throughput requirements will be present. Then, a single large cell 4 comprising these network stations will be sufficient to handle all data traffic related to that cell 4.

Figure 2A:
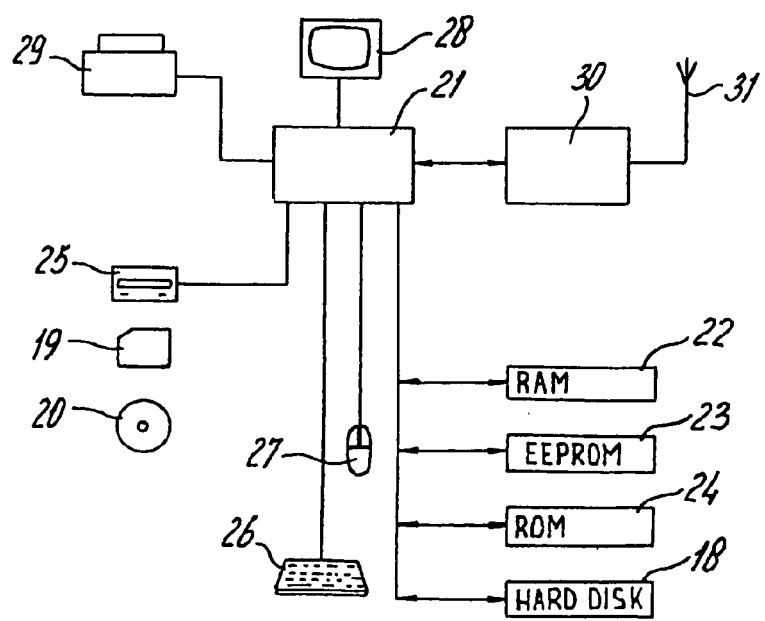
FIG. 2a shows a schematic block diagram of a network station in the present invention.

FIG. 2a shows a schematic block diagram of an embodiment of a network station 5, 6 comprising processor means 21 with peripherals. The processor means 21 is connected to memory units 18, 22, 23, 24 which store instructions and data, one or more reading units 25 (to read, e.g., floppy disks 19, CD ROM's 20, DVD's, etc.), a keyboard 26 and a mouse 27 as input devices, and as output devices, a monitor 28 and a printer 29. Other input devices, like a trackball and a touch screen, and output devices may be provided for. For data-communication over the wireless LAN 1, an interface card 30 is provided. The interface card 30 connects to an antenna 31.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art.

In an alternative embodiment of the present invention, the network station 5, 6 may be a telecommunication device in which the components of interface card 30 are incorporated as known to those skilled in the art.

Figure 2B:
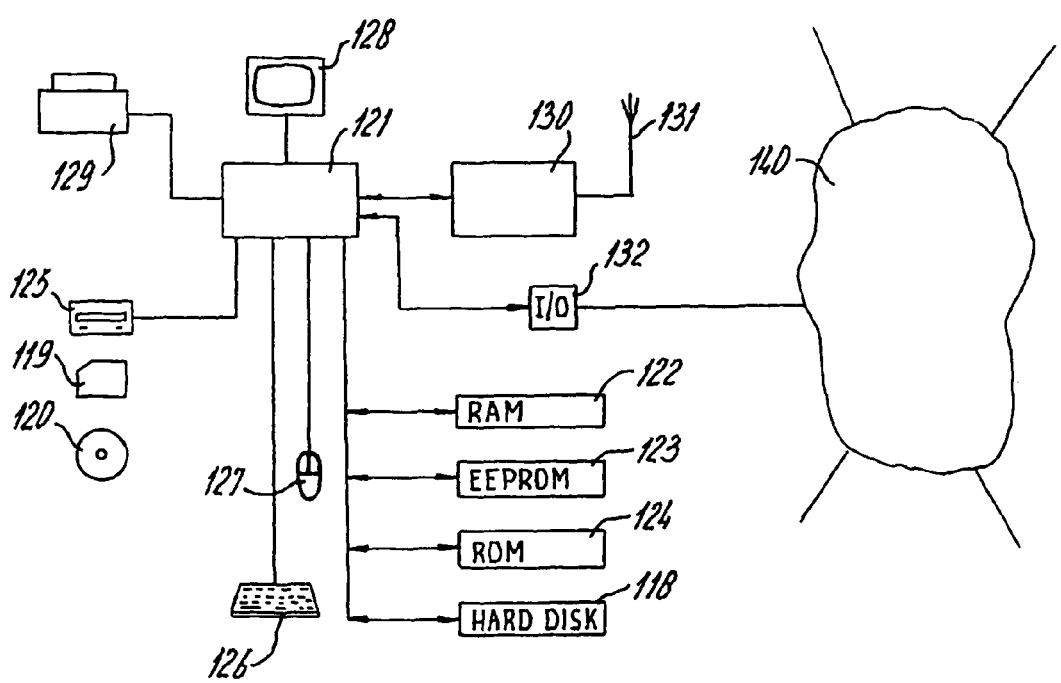
FIG. 2b shows a schematic block diagram of an access point of the present invention.

FIG. 2b shows a schematic block diagram of an embodiment of an access point AP1, AP2, AP3 comprising processor means 121 with peripherals. The processor means 121 is connected to memory units 118, 122, 123, 124 which store instructions and data, one or more reading units 125 (to read, e.g., floppy disks 119, CD ROM's 120, DVD's, etc.), a keyboard 126 and a mouse 127 as input devices, and as output devices, a monitor 128 and a printer 129. For data-communication over the wireless LAN 1, an interface card 130 is provided. The interface card 130 connects to an antenna 131. Furthermore, the access point AP1, AP2, AP3 is connected to a wired distribution network 140 through I/O means 132 for communication with other access points.

The memory units shown comprise RAM 122, (E)EPROM 123, ROM 124 and hard disk 118. However, it should be understood that there may be provided more and/or other memory units known to persons skilled in the art. Moreover, one or more of them may be physically located remote from the processor means 121, if required. The processor means 121 are shown as one box, however, they may comprise several processing units functioning in parallel or controlled by one main processor, that may be located remote from one another, as is known to persons skilled in the art. Moreover, other input/output devices than those shown (i.e., 126, 127, 128, 129) may be provided.

In an alternative embodiment of the present invention, the access point AP1, AP2, AP3 may be a telecommunication device in which the components of interface card 130 are incorporated as known to those skilled in the art.

Figure 2C:
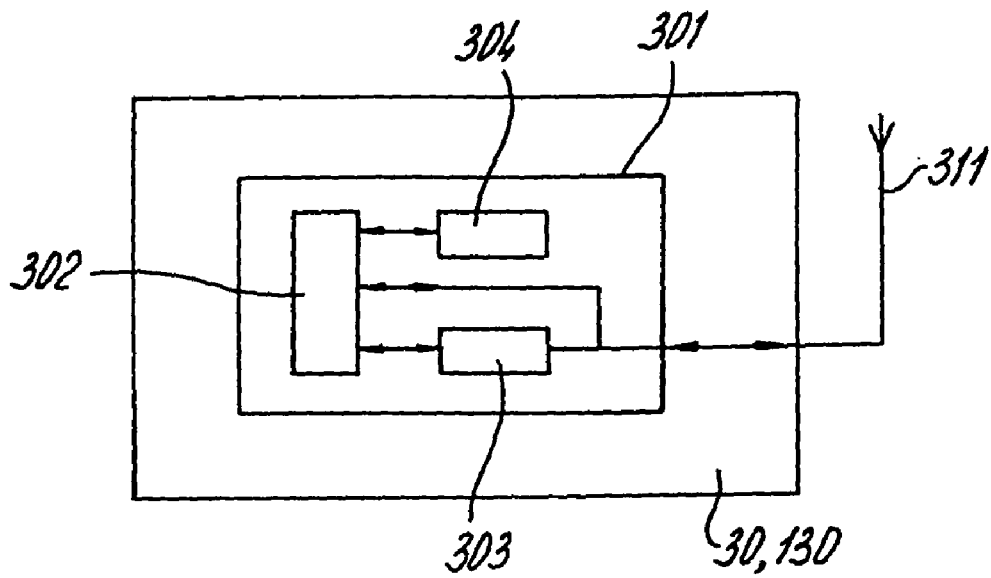
FIG. 2c shows a schematic example of a wireless LAN interface for medium access controller devices as described in this invention for use in a network station or an access point.

FIG. 2c shows a block diagram of the arrangement of the present invention for a medium access controller (MAC) device 301 on a wireless LAN interface card 30 installed in a network station 5, 6 or on a similar wireless LAN interface card 130 installed in an access point AP1, AP2, AP3, respectively.

Here, the MAC device 301 is schematically depicted, showing only a signal processing unit 302, a signal reception level detection circuit 303, antenna 311 and a on-board memory 304 as needed for the description of this embodiment of the invention. The MAC device 301 may comprise other components not shown here. Also, the components 302, 303, 304 which are shown, may be separate devices or integrated into one device. As desired, the devices also may be implemented in the form of analog or digital circuits. The on-board memory 304 may comprise RAM, ROM, FlashROM and/or other types of memory devices, as are known in the art.

During operation, a network station is associated with one of the access points in the network. As defined by IEEE 802.11, when a network station enters a network cell, it engages in a connection with the cell's access point through an initialisation process known as association. In FIG. 1, for example, the network station 5 is connected to the access point AP1 for all its data traffic. The network station 5 continuously monitors the communication quality (i.e. the difference between the signal reception level and the average noise level) of its connection to the access point AP1. As long as a good communication quality for the associated access point AP1 is maintained, the network station 5 stays connected to AP1. When the communication quality decreases below a predetermined level (i.e. determined by the AP density level settings the station 5 received during the association with AP1), the network station 5 starts to search for a cell 3, 4 (an access point AP2, AP3) with a better communication quality. To this purpose, the network station 5 is probing the associated access point AP1 and all other access points AP2, AP3 within range, as known to persons skilled in the art. In this procedure the network station 5 uses the signal reception level of the Beacon frames received from the associated access point AP1 and the Probe Response frames from those other access points AP2, AP3. The Probe Response frames are received by the network station 5 following Probe Request frames sent by the network station 5. As known from IEEE 802.11, the other access points AP2, AP3 may be operating on channels with other frequencies than the associated access point AP1.

As in prior art, the network station 5 can derive the average noise level (NLST) from the reception of signals through signal reception level detection circuit 303. In the present invention the network station 5 also receives data on the average noise level of an access point from an extension of that access point's Beacon and/or Probe response frames which indicate the average noise level (NLAP) observed by the access point.

Since the average noise level in a transmission may have a spatially asymmetric distribution due to interference, the present invention provides a way to account for differences in average noise level observed by the network station 5 and by the access point (AP1, AP2, AP3). The network station 5 will choose the largest value of the average noise level (i.e. NLAP as observed by the access point or NLST as observed by the network station) to determine the minimum communication quality for that access point.

Furthermore, in the embodiment of the present invention the decision of a network station 5 to switch from an access point AP1 to another access point AP2, AP3 is dependent not only on the communication quality of each respective access point but also on the traffic load of each access point and of the network station itself. The present invention provides an extension in the scanning and hand-over process of a network station 5, 6 based on a combination of the communication quality (signal reception level and average noise level) and the load (of both the access points AP1, AP2, AP3 available to the station and the station 5, 6 itself). The access points AP1, AP2, AP3 monitor their traffic load (modem utilisation), preferably, by keeping record of the Average TX/RX Activity Time (ATT) value averaged over a certain time interval (e.g. 10 s) (TX/RX: transmission/reception). In the MAC device 301 the signal processing unit 302 monitors the amount of all data transmitted and received by the access point. The ATT value is accumulated in the on-board memory device 304.

The network station 5, 6 keeps record of the Average Unicast TX/RX Activity Time (AUTT) value averaged over a certain time interval (e.g. 10 s). This value represents the traffic load of the network station (5, 6) itself. In the MAC device 301 the signal processing unit 302 monitors the amount of all data transmitted and received by the network station. The AUTT value is accumulated in the on-board memory device 304.

Both the ATT and AUTT values could be represented by a number in the range from 0 to 100, and could be regarded as a percentage of the modem utilisation of access point and network station, respectively. It will be understood that other representations of these values may be used as well.

Access points in a wireless LAN of the present invention will incorporate the load information as given by the ATT value in the Beacon and Probe Response frames within an additional new data frame. The Beacon and Probe Response frames are specified according to IEEE 802.11. In the present invention, a LBinfo (Load Balancing Information) data frame extends both frames and follows directly after the standard IEEE 802.11 Beacon or Probe Response frame.

Figure 3:
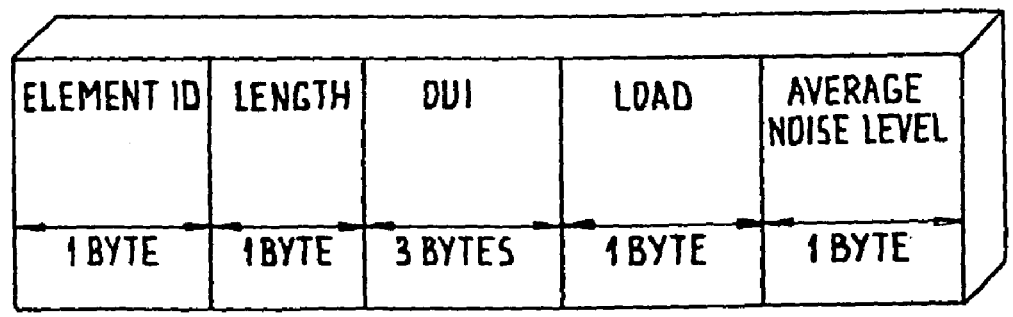
FIG. 3 shows diagrammatically the extended load balancing information data frame used in the Beacon and Probe Response frames according to the present invention.

In FIG. 3 an exemplary block diagram of the layout of the LBinfo data frame is given. The LBinfo data frame comprises in this order: Element ID (1 byte), Length (1 byte), OUI (3 bytes), Load (1 byte) and Average noise level (1 byte).

The Element ID identifies the data frame, which, in this case, is the LBInfo data frame. The Length byte yields the number of bytes in the remainder of the data frame. The OUI bytes contain an Organisationally Unique Identifier for the data frame. In the Load element of LBinfo, the access point transmits the actual ATT value. In the element Average noise level (NLAP) the access point transmits an indication of the actual noise level, experienced by the access point.

It should be noted that, for reasons of compatibility, the IEEE 802.11 specifies that additional new data frames following directly after the standard IEEE 802.11 Beacon frame or Probe Response frame should be ignored by hardware (i.e., access points and network stations) that lacks the appropriate implementation for the new data frames Thus, in this embodiment, the present invention is compatible with existing devices from the prior art.

Furthermore, it should be noted that in FIG. 3 the LBInfo data frame consists of just seven bytes. It may however be possible that the LBInfo data frame comprises more bytes to transmit additional information regarding the load of the access point.

During roaming, in an operation mode known as the connected scan state, a network station 5 that is associated with an access point AP1, will update the information on the connection with AP1 on a regular basis (e.g. every 2 s). From the LBinfo data frame in the Beacon frame from the access point AP1, the network station 5 can ascertain an indication of the communication quality and the load of the access point AP1: the Load of AP1 (ATT) is transmitted by the access point AP1.

The network station 5 has accumulated information on its data traffic load (AUTT). Through its signal reception level detection circuit 303, the network station 5 has information on the signal reception level (SRL) and the average noise level (NLST) as observed by the network station 5.

The network station 5 chooses the largest value (ANL) for the average noise level (i.e. average noise level NLAP of the access point or average noise level NLST of the network station) for further calculations.

The network station can now evaluate the connection by calculation of a combined communication quality and load value (CQL) which is formed through a cost function using the values of SRL, ANL, and ATT. The cost function may be a linear function, but other non-linear functions are possible as well. Also, the cost function may use a weight factor WEIGHT to modify the relative influence of communication quality and load in the cost function. The value of WEIGHT may be a function of the connection or scan state of the network station 5 (i.e. connected scan state, searching scan state: for a new access point, or out-of-range scan state: not connected to any access point). For example, the relative weight of the traffic load in the calculation of CQL may be lower in the searching scan state than in the connected scan state, and may be the lowest while in the out-of-range scan state. Also the network station 5 may derive a threshold value ThV from the AP density setting (which is also transmitted by the access point in the Beacon frame).

On the basis of the CQL value calculated in the cost function and the threshold value ThV, the network station 5 can (decide to) change its association with access point AP1 and search for other available access points AP2, AP3.

Similarly to this procedure, while in the connected scan state during roaming, the network station can evaluate communication quality and load when the network station 5 is searching for another access point (searching scan state) or when the network station is out-of-range (out-of-range scan state). Obviously, both the cost function weight factor and the AP density setting threshold value ThV will be different in the later cases.

In FIG. 4 a flow diagram of the roaming procedure for a network station (5, 6) in the present invention is shown.

In step 41 the Beacon frame of access point AP1 is received. The values ATT of AP1, Average noise level NLAP of AP1 are stored by the processing unit 302 in memory device 304.

In step 42 the strength of the received signal is determined by the processing unit 302 and stored in memory device 304. Also the network station 5 determines its average noise level NLST for the access point AP1.

In step 43, the processing unit in the MAC device 301 of the station determines the value of ANL by comparing NLAP and NLST. If NLAP is larger than NLST, then the value of ANL becomes equal to NLAP, else ANL becomes equal to NLST. ANL is stored by processing unit 302 in memory device 304.

In step 44, the processing unit in the MAC device 301 of the network station chooses a threshold value ThV and a weight factor WEIGHT on basis of the scan state of the network station, In step 45, the communication quality and load value CQL is calculated using the cost function with the values of ATT, Signal reception level SRL, Average noise level ANL, ThV, and WEIGHT, which is continuously updated by the processing unit 302.

In step 46, the processing unit 302 compares CQL and ThV. If CQL is larger than ThV, the network station will stay connected to the present access point AP1. If so, the procedure continues in step 51.

In step 47, if CQL is smaller than ThV, the processing unit must change scan state and check whether the network station 5 is out-of-range.

In step 48, the processing unit starts a scanning procedure for another cell while still in range. The procedure continues in step 50.

In step 49, the processing unit starts a scanning procedure while out-of-range. The procedure continues in step 50.

In step 50, the network station 5 performs a search for available access points based on the reception level of their signals and their traffic loads. The procedure will be described in more detail in FIG. 5.

In step 51 the processing unit exits the roaming procedure.

During normal association of the network station 5 with the access point AP1, the network station 5 also monitors all available access points AP1, AP2, AP3 on a regular basis, to get information on their respective traffic load. Since traffic load per access point can vary strongly in time, due to the generally spiky characteristics of data transfers, the time interval on which the traffic load will be averaged, must be chosen sufficiently large (e.g. 60 s). In this load balancing procedure, similar to the roaming procedure, network station 5 probes the Beacon frame of the access point AP1 and the Probe Response frames of all available access points AP2, AP3. For each access point AP1, AP2, AP3 the network station 5 gathers values for ATT, threshold value ThV, WEIGHT, signal reception level SRL. For each access point (AP1, AP2, AP3) the average noise level ANL is determined as explained above from the values of NLAP and NLST. Additionally, the value of AUTT, the load of the network station 5 itself, is used as well. Using the cost function, the network station 5 will evaluate for each access point AP1, AP2, AP3 the communication quality and load value CQL. For the access points AP2, AP3 to which the network station is not associated, the load of the network station 5 is added to the load of the access point before calculating the cost function. The CQL value and the threshold value ThV for each access point AP1, AP2, AP3 are stored in an array format in memory device 304.

The processing unit 302 of the network station 5 now compares the stored communication and load values CQL for each access point AP1, AP2, AP3, and chooses the access point with the largest CQL value: this access point has the best overall quality. If it is necessary at this time to switch from one access point to another, the network station 5 will disassociate from the former access point and associates with the latter access point, according to the rules as defined by IEEE 802.11.

It is to be understood that all network stations 5, 6 in the network, apply this load balancing procedure continually at fixed time intervals (e.g. 60 s) and as a result, the distributions of associations across the network will even out over time, with a better balance of traffic load across the network and better overall data throughput. By employing a random starting time when a network station initialises, the network station waits a random time before running the load balancing procedure. This ensures that only a single network station 5, 6 runs this procedure at a given time. Also, the CSMA/CA scheme will prohibit possible collisions of transmissions in the network.

In FIG. 5 a flow diagram of the load balancing procedure for a network station in the present invention is shown.

In step 52, the network station performs a sweep to collect LBinfo from all available access points AP1, AP2, AP3, either through the Beacon frame or the Probe Response frame (after the station sending the Probe Request frame). For each access point AP1, AP2, AP3 the values ATT, Average noise level NLAP, threshold value ThV, and the signal reception level SRL, are stored by the processing unit 302 in memory device 304. Also the network station 5 determines its average noise level NLST for EACH access point (AP1, AP2, AP3)

In step 53, the processing unit in the MAC device 301 of the station determines the value of ANL by comparing NLAP and NLST. If NLAP is larger than NLST, then the value of ANL becomes equal to NLAP, else ANL becomes equal to NLST. For each access point (AP1, AP2, AP3) ANL is stored by processing unit 302 in memory device 304.

In step 54, the weight factor WEIGHT is set dependent on the connection or scan state of the network station with respect to the access point to which it is associated.

In step 55, for each access point AP1, AP2, AP3 the communication quality and load value CQL is calculated by the processing unit 302 using the cost function with the values of ATT, Signal reception level SRL, Average noise level ANL, ThV, WEIGHT. In case the network station is not associated with the access point, the actual AUTT of the network station is added to the load value ATT of the access point. The values CQL are stored in an array format in memory device 304.

In step 56, the processing unit 302 compares the stored values CQL and calculates which access point has the largest CQL value.

In step 57, the processing unit checks if the access point with the largest CQL value equals the access point the network station is already associated with. If not, then the program continues in step 58, else if the best access point is the associated access point, the program continues in step 59.

In step 58, the network station changes its association from the old access point to the access point with better overall quality, using the disassociation and association procedures as defined by IEEE 802.11. The program continues in step 59.

In step 59, the timer for the load balancing procedure is reset to count down for the next execution of the procedure (e.g. after 60 s). Here the load balancing procedure ends, the processing unit 302 returns to the calling procedure.

Here an example is given of a possible scenario where load balancing can be useful. The access points AP1, AP2, and AP3 as shown in FIG. 1 give for the network station different signal reception levels SRL and average noise levels ANL, and different traffic loads ATT. In this example a linear cost function will be used to keep matters simple, but it is to be understood that non-linear functions also may be applied. Also for simplicity, the comparison of average noise levels NLAP and NLST observed by an access point and the network station, respectively, is omitted here. The resulting values ANL, obtained as described in step 43 of FIG. 4, are given here directly.

The cost function used here is given in equation 1.

$$CQL=(SRL-ANL)-WEIGHT*ATT \quad (1)$$

In the table below the network station's signal reception level (SRL) with respect to each access point, its average noise level (ANL) with respect to each access point (channel frequency used) and each access point's averaged traffic load (ATT) are given.

| Access Point | SRL | ANL | ATT |
|---|---|---|---|
| AP1 | 55 | 18 | 48 |
| AP2 | 55 | 19 | 45 |
| AP3 | 53 | 21 | 3 |

Clearly, the traffic load in the network is somewhat unbalanced. Assume the network station 5 is associated with access point AP1 in the connected scan state. Further assume that the weight factor WEIGHT is 0.5 (as an example, the value for the connected scan state), and the load of the network station AUTT is 10. The threshold value ThV is 30 (30 dB signal-to-noise ratio). When the Beacon frame is received (step 41), the processing unit will calculate the CQL value of the associated access point using steps 42 and 44 according to the description of FIG. 4. According to equation 1, the value of CQL is 13. In step 45, comparison of CQL with the threshold value ThV shows that CQL is smaller than ThV, but the network station 5 is still in range of AP1. Now, in step 47 the processing unit 302 of the network station 5 will enter into a searching scan state to look for other access points AP2, AP3 with possibly a better overall quality. The procedure continues in step 52 of FIG. 5. In step 54 WEIGHT is now set to a value of 0.25 (as an example, the value for the search scan state). In step 55 CQL for each access point AP1, AP2, AP3 is calculated. For the associated access point equation 1 is used. For the other access points AP2, AP3 the following equation 2 is used in which the traffic load AUTT of the network station 5 is added to the traffic load ATT of the access points.

$$CQL=(SRL-ANL)-WEIGHT*(ATT+AUTT) \quad (2)$$

In the following table the calculated CQL values for each access point AP1, AP2, AP3 are given, with AUTT=10 and WEIGHT=0.25.

| Access Point | CQL |
|---|---|
| 1 | 25 |
| 2 | 22 |
| 3 | 28 |

In step 56, these different CQL values are compared. Based on these numbers, the network station 5 will establish that the access point AP3 provides the best overall quality. In step 57, it is checked whether the network station 5 is already associated with access point AP3. If so, the timer is reset in step 59. If not, in step 58, the network station 5 switches to access point AP3.

Finally, FIGS. 6a-6f illustrate the effect of load balancing on the roaming process of a mobile network station. In FIGS. 6a-6f a map is shown of an indoor environment with a width of 12 m and a length of 50 m. In the environment two access points AP4 and AP5 are installed. Access point AP4 is installed at map-coordinates X=5 m, Y=5 m, and access point AP5 at X=25 m, Y=7 m. The scale of the building is indicated along the horizontal and vertical directions, wherein the X-direction denotes the horizontal direction, and the Y-direction the vertical direction. AP4 is using the channel at 2412 MHz, while AP5 is using the channel at 2432 MHz. Both access points use a transmit power of 35 mW. The average noise levels NLAP of the access points AP4 and AP5 are assumed to be equal. Also the average noise level NLST of the network station is assumed to be constant. The cell size of both access points is configured for a setting of AP density high, with a cell search threshold of 30 dB. The traffic load on AP4 is 30 (percent), while the traffic load on AP5 is minimal (zero).

Figure 6A:
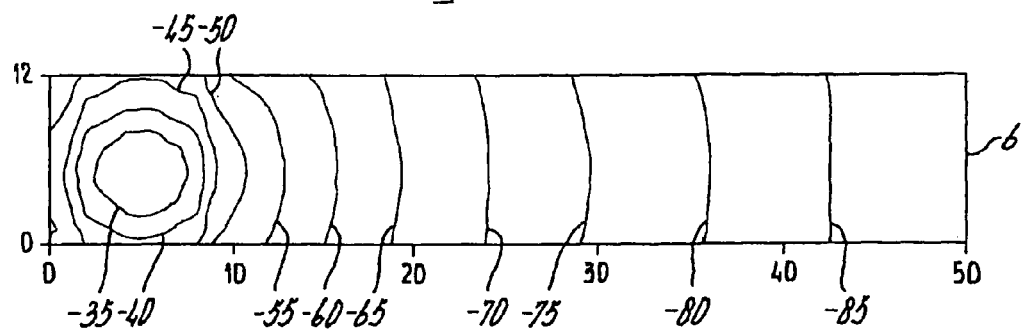
FIGS. 6a-6f are a schematic illustration of the effect on the roaming behaviour of network stations in a network configuration, with and without load balancing, according to the present invention.
Figure 6B:
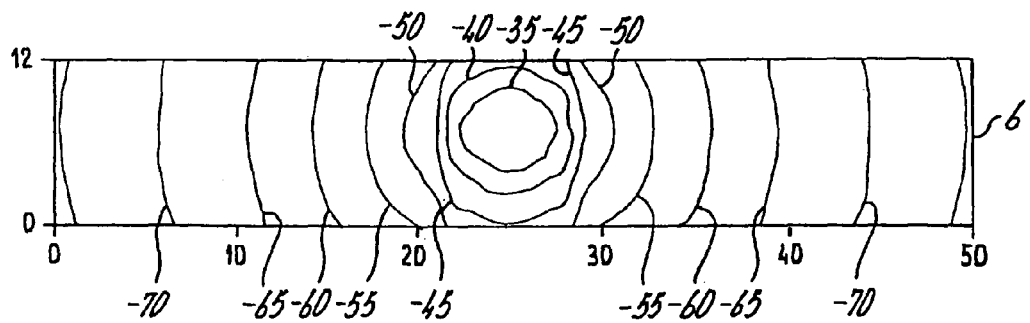
Figure 6C:
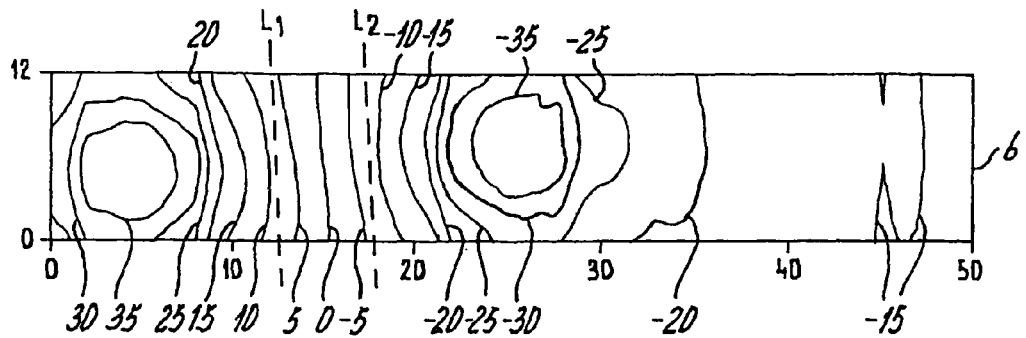

In FIG. 6a the signal reception level (in dBm) of access point AP4 by a network station is shown as a contour map. FIG. 6b shows the contour map of the signal reception level (in dBm) of AP5. In FIG. 6c the difference in signal reception level (AP4 relative to AP5) is shown. In FIG. 6a, 6b, 6c the level of each contour line is denoted by its value. Without load balancing a mobile network station that is moving from a position close to AP4 towards AP5, will enter the search scan state when the signal reception level difference becomes less than 8 dB. On the map this level is marked by dashed line L1 and line L2. Line L1 marks the 8 dB difference in signal reception level going from a location close to AP4 in the direction of AP5. Line L2 marks the 8 dB difference in signal reception level when going in the opposite direction.

Figure 6D:
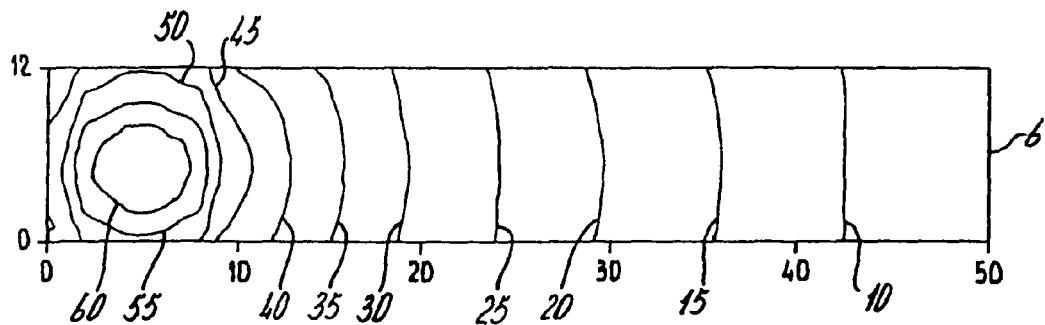
Figure 6E:
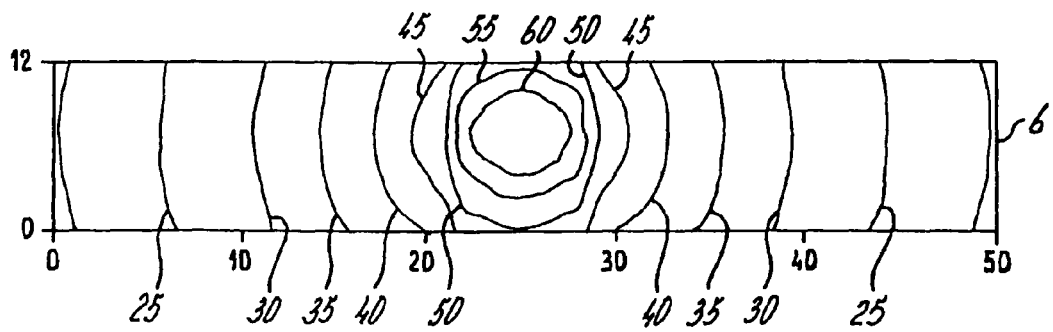
Figure 6F:
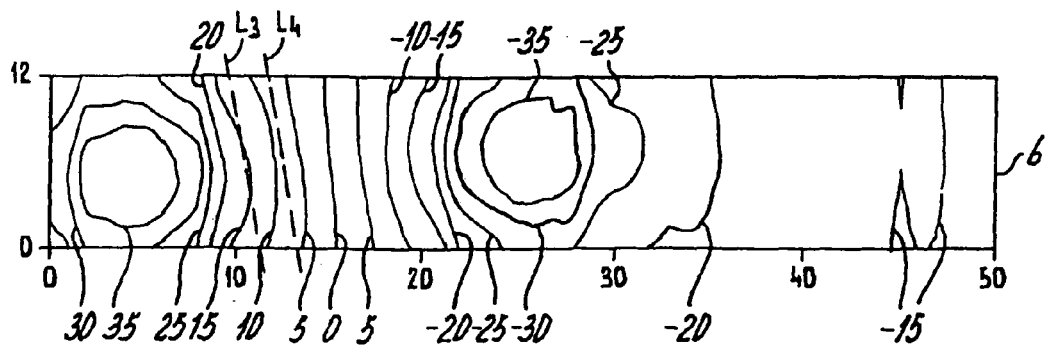

FIGS. 6d, and 6e show the combined communication quality and load value CQL of access points AP4 and AP5, respectively as a contour map. FIG. 6f shows again the difference in signal reception level (in dB, AP4 relative to AP5). In FIGS. 6d and 6e the level of each contour line is denoted by its CQL-value. In FIG. 6f the level of each contour line is denoted by its value of the difference in signal reception level.

When using the load balancing procedure, the mobile station which moves from a location close to AP4 towards AP5, will start searching for an access point with better overall quality as soon as the CQL value is below 30. When the load on access point AP4 is minimal, the position of the mobile station for this condition is marked in FIG. 6d by the contour line 30 with level 30. However, due to the load on AP4 (load value: 30), the transition to the search scan state will shift with respect to this contour line. When the simple linear cost function of equation 1 is used with a weight factor WEIGHT=0.5, the CQL value of 30 is already reached at contour line 45 (level 45) in FIG. 6d. The search scan state zone is now shifted towards the busier access point AP4 and is reached already at a higher signal reception level of AP4. As shown in FIG. 6f the lines marking the searching scan state criterion are given as L3 and L4. When looking at the difference in signal reception level, the search scan state is entered at approximately 15 dB (L3, going from AP4 towards AP5), and at approximately 7 dB (L4, going in the opposite direction).

By using this procedure, the effective cell size around access points with a high traffic load will shrink. Mobile network stations will start roaming earlier to an access point with less traffic load. The present invention yields a better overall throughput in a network by the combined load balancing and roaming scheme.

What is claimed:

1. A method to be carried out by a network station arranged to communicate with one of a plurality of access points through a wireless communication protocol, said method comprising:

receiving, from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;

deriving access point signal reception level parameters for said plurality of access points from signal reception levels of messages transmitted from said plurality of access points to said network station;

deriving a network station noise level parameter indicative of noise level at said network station;

deriving a network station traffic load parameter indicative of congestion at said network station and different from said access point traffic load parameters; and selecting a communication connection with one of said plurality of access points taking at least said access point noise level parameters, said access point traffic load parameters, said access point signal reception level parameters, said network station traffic load parameter, and said network station noise level parameter into account.

2. The invention of claim 1, wherein said method comprises:

selecting the larger of a first access point noise level parameter and said network station noise level parameter as a minimum noise level parameter, and selecting the communication connection with said one of said plurality of access points taking said minimum noise level parameter into account.

3. The invention of claim 1, wherein, when said network station has an existing communication connection with a first access point of said plurality of access points, said method comprises:

receiving (i) a first access point noise level parameter indicative of communication quality at said first access point and (ii) a first access point traffic load parameter indicative of congestion at said first access point, wherein said first access point noise level parameter and said first access point traffic load parameter are received as data embedded in at least one message transmitted from said first access point to said network station;

deriving a first access point signal reception level parameter for said first access point from a signal reception level of at least one message transmitted from said first access point to said network station;

deriving said network station noise level parameter indicative of said noise level at said network station;

generating a first cost function value for said first access point taking at least said first access point noise level parameter, said first access point traffic load parameter, said first access point signal reception level parameter, and said network station noise level parameter into account; and comparing said first cost function value to a threshold value to determine whether to scan for another access point.

4. The invention of claim 3, wherein, when said network station decides to scan for another access point, said method further comprises:

receiving (i) one or more other access point noise level parameters indicative of communication quality at one or more other access points and (ii) one or more other access point traffic load parameters indicative of congestion at said one or more other access points, wherein said first access point noise level parameters and said first access point traffic load parameters are received as data embedded in one or more messages transmitted from said one or more other access points to said network station;

deriving one or more access point signal reception level parameters for said one or more other access points from signal reception levels of one or more messages transmitted from said one or more other access points to said network station;

generating, for each other access point, an other cost function value taking at least a corresponding other access point noise level parameter, a corresponding other access point traffic load parameter, a corresponding other access point signal reception level parameter, and said network station noise level parameter into account; and selecting said communication connection with said one of said plurality of access points based on said first cost function value and said one or more other cost function values.

5. The invention of claim 4, wherein said method further comprises:

deriving a network station traffic load parameter indicative of congestion at said network station and different from said access point traffic load parameters, wherein said network station traffic load parameter is taken into account in generating each of said one or more other cost function values.

6. The invention of claim 4, wherein said method further comprises:

determining a weight factor indicative of scan state of said network station; and taking said weight factor into account in generating said first cost function value and each of said one or more other cost function values.

7. The invention of claim 1, wherein said method further comprises:

determining a weight factor indicative of scan state of said network station, wherein said communication connection with one of said plurality of access points is selected taking at least said access point noise level parameters, said access point traffic load parameters, said access point signal reception level parameters, said network station noise level parameter, and said weight factor into account.

8. A method carried out by a communication system comprising a plurality of access points and a network station, said method comprising:

monitoring, by at least one access point, access point noise level indicative of communication quality at said access point;

monitoring, by said at least one access point, access point traffic load indicative of congestion at said access point;

transmitting, by said at least one access point, an access point noise level parameter indicative of said access point noise level and (ii) an access point traffic load parameter indicative of said access point traffic load to said network station, wherein said access point noise level parameter and said access point traffic load parameter are transmitted as data embedded in one or more messages transmitted from said access point to said network station;

receiving, by said network station from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;

deriving access point signal reception level parameters for said plurality of access points from signal reception levels of messages transmitted from said plurality of access points to said network station;

deriving a network station noise level parameter indicative of noise level at said network station;

deriving a network station traffic load parameter indicative of congestion at said network station and different from said access point traffic load parameters; and selecting, by said network station, a communication connection with one of said plurality of access points taking at least said access point noise level parameters, said access point traffic load parameters, said access point signal reception level parameters, said network station traffic load parameter, and said network station noise level parameter into account.

9. The invention of claim 8, wherein said method comprises:

selecting, by said network station, the larger of a first access point noise level parameter and said network station noise level parameter as a minimum noise level parameter, and selecting, by said network station, the communication connection with said one of said plurality of access points taking said minimum noise level parameter into account.

10. A network station arranged to communicate with one of a plurality of access points through a wireless communication protocol, wherein said network station is arranged to:

receive, from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;

derive access point signal reception level parameters for said plurality of access points from signal reception levels of messages transmitted from said plurality of access points to said network station;

derive a network station noise level parameter indicative of noise level at said network station;

derive a network station traffic load parameter indicative of congestion at said network station and different from said access point traffic load parameters; and select a communication connection with one of said plurality of access points taking at least said access point noise level parameters, said access point traffic load parameters, said access point signal reception level parameters, said network station traffic load parameter, and said network station noise level parameter into account.

11. The invention of claim 10, wherein said network station is arranged to:

select the larger of a first access point noise level parameter and said network station noise level parameter as a minimum noise level parameter, and select the communication connection with said one of said plurality of access points taking said minimum noise level parameter into account.

12. The invention of claim 11, wherein said first access point noise level parameter is an average noise level, said network station noise level parameter is an average noise level, and said minimum noise level parameter is an average noise level.

13. The invention of claim 10, wherein, when said network station has an existing communication connection with a first access point of said plurality of access points, said network station is arranged to:

receive (i) a first access point noise level parameter indicative of communication quality at said first access point and (ii) a first access point traffic load parameter indicative of congestion at said first access point, wherein said first access point noise level parameter and said first access point traffic load parameter are received as data embedded in at least one message transmitted from said first access point to said network station;

derive a first access point signal reception level parameter for said first access point from a signal reception level of at least one message transmitted from said first access point to said network station;

derive said network station noise level parameter indicative of said noise level at said network station;

generate a first cost function value for said first access point taking at least said first access point noise level parameter, said first access point traffic load parameter, said first access point signal reception level parameter, and said network station noise level parameter into account; and compare said first cost function value to a threshold value to determine whether to scan for another access point.

14. The invention of claim 13, wherein, when said network station decides to scan for another access point, said network station is further arranged to:

receive (i) one or more other access point noise level parameters indicative of communication quality at one or more other access points and (ii) one or more other access point traffic load parameters indicative of congestion at said one or more other access points, wherein said first access point noise level parameters and said first access point traffic load parameters are received as data embedded in one or more messages transmitted from said one or more other access points to said network station;

derive one or more access point signal reception level parameters for said one or more other access points from signal reception levels of one or more messages transmitted from said one or more other access points to said network station;

generate, for each other access point, an other cost function value taking at least a corresponding other access point noise level parameter, a corresponding other access point traffic load parameter, a corresponding other access point signal reception level parameter, and said network station noise level parameter into account; and select said communication connection with said one of said plurality of access points based on said first cost function value and said one or more other cost function values.

15. The invention of claim 14, wherein said network station is further arranged to:

derive a network station traffic load parameter indicative of congestion at said network station and different from said access point traffic load parameters; and take said network station traffic load parameter into account in generating each of said one or more other cost function values.

16. The invention of claim 14, wherein said network station is further arranged to:

determine a weight factor indicative of scan state of said network station; and take said weight factor into account in generating said first cost function value and each of said one or more other cost function values.

17. The invention of claim 10, wherein said network station is further arranged to:
 determine a weight factor indicative of scan state of said network station, wherein said communication connection with one of said plurality of access points is selected taking at least said access point noise level parameters, said access point traffic load parameters, said access point signal reception level parameters, said network station noise level parameter, and said weight factor into account.

18. A communication system comprising a plurality of access points and a network station, wherein:
 at least one access point is arranged to:
  monitor its access point noise level indicative of communication quality at said access point;
  monitor its access point traffic load indicative of congestion at said access point; and
  transmit (i) an access point noise level parameter indicative of said access point noise level and (ii) an access point traffic load parameter indicative of said access point traffic load to said network station, wherein said access point noise level parameter and said access point traffic load parameter are transmitted as data embedded in one or more messages transmitted from said access point to said network station; and
 said network station is arranged to:
  receive, from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;
  derive access point signal reception level parameters for said plurality of access points from signal reception levels of messages transmitted from said plurality of access points to said network station;
  derive a network station noise level parameter indicative of noise level at said network station;
  derive a network station traffic load parameter indicative of congestion at said network station and different from said access point traffic load parameters; and
  select a communication connection with one of said plurality of access points taking at least said access point noise level parameters, said access point traffic load parameters, said access point signal reception level parameters, said network station traffic load parameter, and said network station noise level parameter into account.

19. The invention of claim 18, wherein said network station is arranged to:
 select the larger of a first access point noise level parameter and said network station noise level parameter as a minimum noise level parameter, and select the communication connection with said one of said plurality of access points taking said minimum noise level parameter into account.

20. The invention of claim 19, wherein said first access point noise level parameter is an average noise level, said network station noise level parameter is an average noise level, and said minimum noise level parameter is an average noise level.

21. A network station arranged to communicate with one of a plurality of access points through a wireless communication protocol, wherein said network station is arranged to:
 receive, from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;
 derive access point signal reception level parameters for said plurality of access points from signal reception levels of messages transmitted from said plurality of access points to said network station;
 derive a network station noise level parameter indicative of noise level at said network station;
 determine a weight factor indicative of scan state of said network station; and
 select a communication connection with one of said plurality of access points taking at least said access point noise level parameters, said access point traffic load parameters, said access point signal reception level parameters, said network station noise level parameter, and said weight factor into account.

22. A method to be carried out by a network station arranged to communicate with one of a plurality of access points through a wireless communication protocol, said method comprising:
 receiving, from said plurality of access points, (i) access point noise level parameters indicative of access point communication quality and (ii) access point traffic load parameters indicative of access point congestion, wherein said access point noise level parameters and said access point traffic load parameters are received as data embedded in messages transmitted from said plurality of access points to said network station;
 deriving access point signal reception level parameters for said plurality of access points from signal reception levels of messages transmitted from said plurality of access points to said network station;
 deriving a network station noise level parameter indicative of noise level at said network station;
 determining a weight factor indicative of scan state of said network station; and
 selecting a communication connection with one of said plurality of access points taking at least said access point noise level parameters, said access point traffic load parameters, said access point signal reception level parameters, said network station noise level parameter and said weight factor into account.

* * * * *